US007675835B2

(12) United States Patent
Bell, Jr. et al.

(10) Patent No.: US 7,675,835 B2
(45) Date of Patent: Mar. 9, 2010

(54) SMALL FORM-FACTOR OPTICAL DATA STORAGE DEVICE

(75) Inventors: Bernard W. Bell, Jr., Lafayette, CO (US); David L. Blankenbeckler, Longmont, CO (US); David H. Davies, Boulder, CO (US); Steven H. Ray, Longmont, CO (US)

(73) Assignee: DPHI Acquisitions, Inc., Longmont, CO (US)

( * ) Notice: Subject to any disclaimer, the term of this patent is extended or adjusted under 35 U.S.C. 154(b) by 1111 days.

(21) Appl. No.: 11/052,367

(22) Filed: Feb. 7, 2005

(65) Prior Publication Data
US 2005/0180272 A1    Aug. 18, 2005

Related U.S. Application Data

(60) Provisional application No. 60/542,406, filed on Feb. 6, 2004.

(51) Int. Cl.
*G11B 7/00* (2006.01)

(52) U.S. Cl. .................................................. 369/121
(58) Field of Classification Search ........................ None
See application file for complete search history.

(56) References Cited

U.S. PATENT DOCUMENTS

| 5,383,175 | A | * | 1/1995 | Finkelstein et al. | 369/121 |
| 5,448,548 | A | * | 9/1995 | Taneya et al. | 369/121 |
| 5,696,753 | A | * | 12/1997 | Okushita | 720/665 |
| 5,828,637 | A | * | 10/1998 | Kim | 369/44.28 |
| 5,832,009 | A | * | 11/1998 | Kikuchi | 372/21 |
| 6,717,893 | B1 | * | 4/2004 | Niss et al. | 369/44.19 |
| 7,388,823 | B2 | * | 6/2008 | Nakata | 369/116 |
| 2003/0026037 | A1 | * | 2/2003 | O'Sullivan et al. | 360/97.01 |
| 2006/0280102 | A1 | * | 12/2006 | Bell et al. | 369/112.23 |
| 2007/0127328 | A1 | * | 6/2007 | Bell et al. | 369/44.19 |

* cited by examiner

*Primary Examiner*—Joseph H Feild
*Assistant Examiner*—Joseph Haley
(74) *Attorney, Agent, or Firm*—Haynes & Boone, LLP.

(57) ABSTRACT

A small form factor optical disk drive is provided. An OPU is mounted on a sled such that an optical path length to the optical media falls substantially between coherence function maxima.

10 Claims, 13 Drawing Sheets

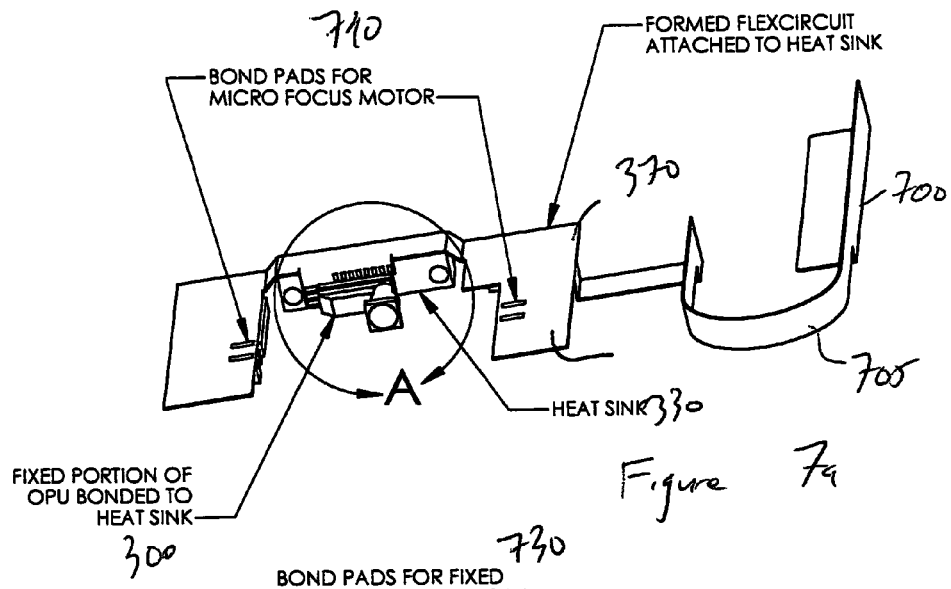
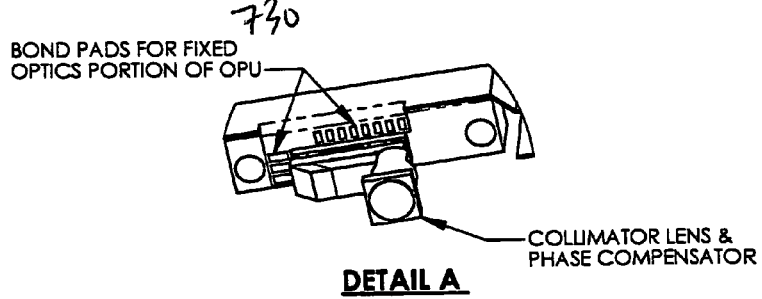
FLEX CIRCUIT / OPU ARCHITECTURE
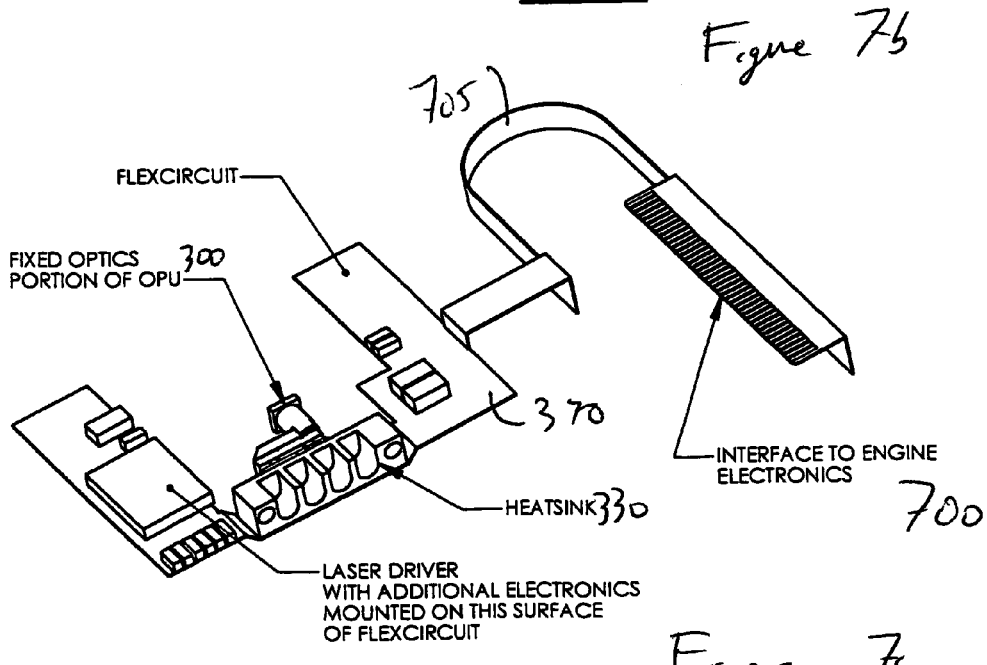

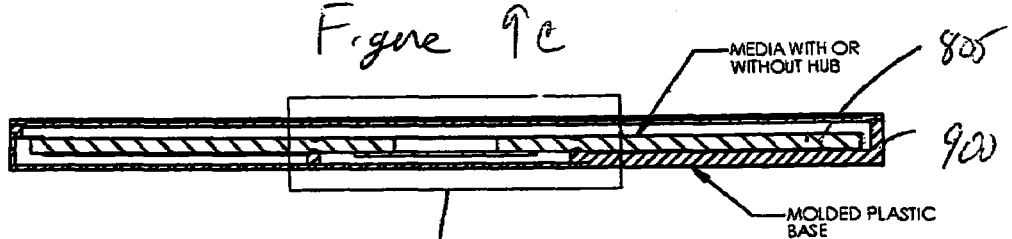
CROSS SECTION OF CARTRIDGE
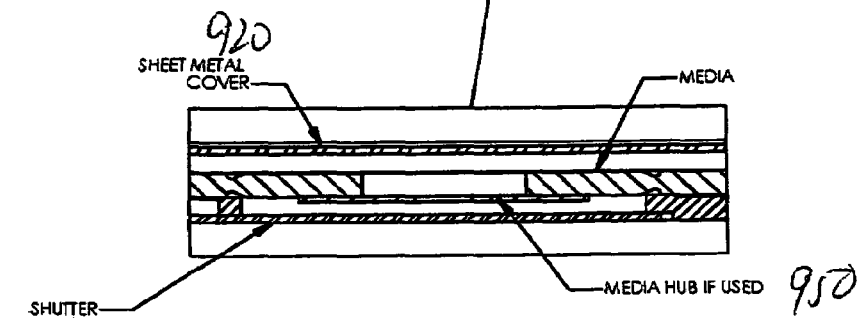

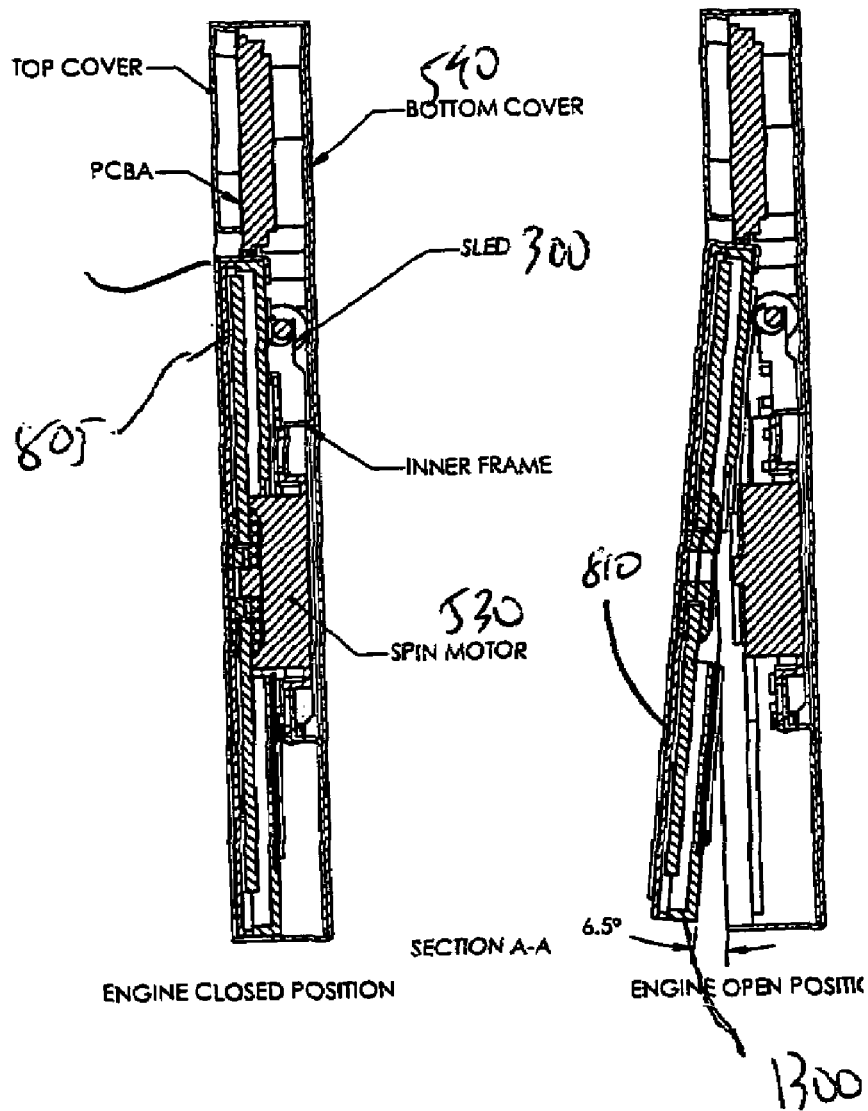

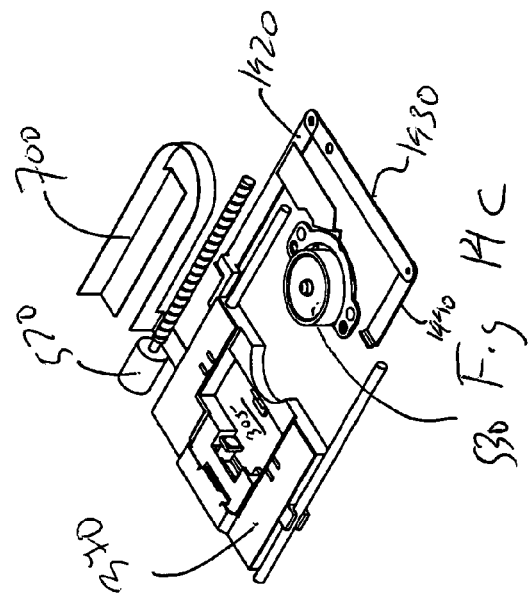
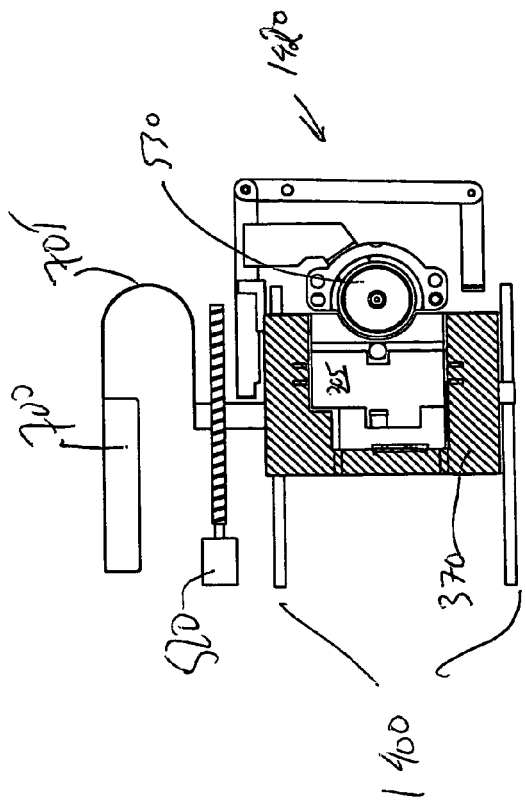
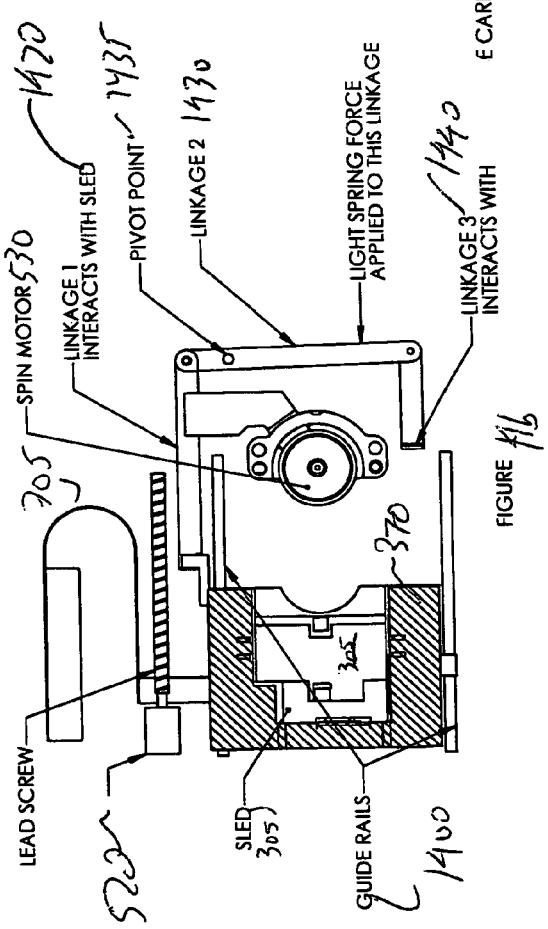

SMALL FORM-FACTOR OPTICAL DATA STORAGE DEVICE

TECHNICAL FIELD

This invention relates to a small form-factor optical data storage device configured to use removable media cartridges.

RELATED APPLICATIONS

This application claims the benefit of U.S. Provisional Application No. 60/542,406, filed Feb. 6, 2004, the contents of which are hereby incorporated by reference in their entirety

BACKGROUND

Many barriers exist to minimizing the form factor of optical disk drives. For example, conventional optical disk drives such as a CD-ROM drive are configured for use with "second surface" optical disks. In a second surface optical disk, the information layer is covered by a relatively thick protective layer or substrate that is hundreds of microns in thickness. Considering that conventional laser light used to read and write in optical drives has a wavelength in the range of from around 400 to 800 nanometers, the relatively thick protective layer is thus many wavelengths in thickness. As such, imperfections such as scratches, dust, and fingerprints on the surface of the protective layer are defocused with respect to the underlying information layer. In this fashion, CD-ROMs and other second surface disks may be handled by users and exposed to dusty environments without needing a protective cartridge.

Although the use of second surface disks provides this advantageous defocusing property, it is also accompanied by certain drawbacks. For example, the relatively thick protective layer covering the information layer introduces significant optical aberrations and wave front distortions. In turn, these optical problems place a floor on the achievable feature size in the information layer, thereby limiting data capacity. However, as the optical disk size is reduced, it is important to minimize feature size in the information layer to provide significant data storage capability despite the presence of a relatively small information layer area. To achieve a significant data capacity within a small form factor optical disk drive, the present assignee has developed first surface optical disks such as disclosed in U.S. Ser. No. 10/891,173, filed Jul. 13, 2004, which is a divisional application of U.S. Ser. No. 09/315,398, filed May 20, 1999, now abandoned, the contents of both applications being incorporated by reference herein in their entirety. In these first surface disks, an information layer covers a substrate, which may be formed to define one or both of a read-only and a writeable area. Advantageously, the information layer may be formed from a continuous phase-change material such as an SbInS alloy so that the formation of the read-only and writeable areas (if both exist) requires no masking or other complicated manufacturing processes. The surface of the information layer may be covered with an optical coupling layer formed from a dielectric such as silicon oxynitride. However, unlike a second surface disk, the optical coupling layer is quite thin (such as less than 100 nm) thereby providing no defocusing effect. Instead, it merely functions as an anti-reflective coating as known in the optical arts to better optically couple the information layer to an air-incident laser beam. Advantageously, the optical coupling layer does not introduce the aberrations and wave front distortions that the protective layer in second surface optical disks does such that the feature size may be substantially reduced. In this fashion, a significant data capacity is achieved despite the presence of a small form factor.

The present assignee also developed a small form factor optical disk drive for use with the inventive first surface optical disks. For example, U.S. Ser. No. 09/950,378, filed Sep. 10, 2001, discloses an optical disk drive having an actuator arm with an optical pick-up unit (OPU) mounted on one end. A cross-sectional view of an OPU 103 is shown in FIG. 1a. A corresponding optical ray trace diagram for OPU 103 is illustrated in FIG. 1b. As seen in FIG. 1a, OPU 103 includes a periscope 210 having reflecting surfaces 211, 212, and 213. Periscope 210 is mounted on a transparent optical block 214. An object lens 223 is positioned on spacers 221 and mounted onto quarter wave plate (QWP) 222 which in turn is mounted on periscope 210. Optical block 214 is mounted through turning mirror 216 and spacer 231 to a silicon submount 215.

A laser 218 is mounted on a laser mount 217 and positioned on silicon submount 215. Detectors 225 and 226 are positioned and integrated onto silicon substrate 215. Laser 218 produces an optical beam 224 which is reflected into transparent block 214 by turning mirror 216. Beam 224 is then reflected by reflection surfaces 212 and 213 into lens 223 and onto an optical medium (seen in FIG. 1b). In some embodiments, reflection surfaces 212 and 213 can be polarization dependent and can be tuned to reflect substantially all of polarized optical beam 224 from laser 218. QWP 222 rotates the polarization of laser beam 224 so that a light beam reflected from the optical medium is polarized in a direction orthogonal to that of optical beam 224.

A reflected beam 230 from optical medium 102 is collected by lens 223 and focused into periscope 210. A portion (in some embodiments about 50%) of reflected beam 230, which is polarized oppositely to optical beam 224, passes through reflecting surface 213 and is directed onto optical detector 226. Further, a portion of reflected beam 230 passes through reflecting surface 212 and is reflected onto detector 225 by reflecting surface 211. Because of the difference in path distance between the positions of detectors 225 and 226, detector 226 is positioned before the focal point of lens 223 and detector 225 is positioned after the focal point of lens 223 as seen in FIG. 1b.

In some embodiments, optical surface 212 is nearly 100% reflective for a first polarization of light and nearly 100% transmissive for the opposite polarization. Optical surface 213 can be made nearly 100% reflective for the first polarization of light and nearly 50% reflective for the opposite polarization of light, so that light of the opposite polarization incident on surface 213 is approximately 50% transmitted. Optical surface 211 can, then, be made nearly 100% reflective for the opposite polarization of light. In that fashion, nearly 100% of optical beam 224 is incident on optical media 102 while 50% of the collected return light is incident on detector 226 and about 50% of the collected return light is incident on detector 225. A portion of laser beam 224 from laser 218 can be reflected by an annular reflector 252 positioned in periscope 210 on the surface of optical block 214. Annular reflector 252 may be a holographic reflector written into the surface of optical block 214 about the position that optical beam 224 passes. Annular reflector 252 reflects some of the laser power back onto a detector 250 integrated onto silicon submount 215. Detector 250 provides an Automatic Power Control (APC) signal that can be used in a servo system to control the output power of laser 218.

Turning now to FIG. 2, an exemplary actuator arm 104 is illustrated. Actuator arm 104 includes OPU 103 at one end. By rotating about an axis B through a spindle 200, actuator arm 104 may move OPU 103 radially with respect to an optical disk (a portion of which is illustrated in FIG. 1b). As used herein, radial movement is defined as movement parallel to an optical disk surface. Thus, to maintain tracking of an optical disk by OPU 103, a tracking servo will command a desired radial displacement of actuator arm 104. By flexing actuator arm 104 about an axis A, OPU 103 may move axially with respect to an optical disk to achieve a desired focus. As used herein, axial movement is defined as movement transverse to an optical disk surface. Thus, to maintain focus, a focus servo will command a desired axial displacement of actuator arm 104. By providing an actuator arm having these properties, a small form factor optical disk drive may be implemented. For example, the height of a disk drive incorporating OPU 103 may be as little as 10.5 mm. However, note that OPU 103 is aligned such that its height dimension H is normal to or in the axial direction with respect to an optical disk surface. Thus, the overall achievable height reduction of such a drive architecture is limited by the thickness of the optical disk and its cartridge as well as height H of OPU 103 (as measured from the bottom of OPU to the focused laser spot at the disk surface).

In certain applications such as mobile phone handsets, is desirable to provide an optical disk drive having a thickness of as little as five mm. However, in the disk drive architecture discussed with respect to FIG. 1a through FIG. 2, the addition of the disk cartridge thickness to the height of the OPU makes the achievement of such a small form factor problematic.

Accordingly, there is a need in the art for optical disk drives and corresponding optical media configured to achieve small form factors.

In addition, the use of a split-optics-based architecture in a optical disk drive introduces "beam walk" resulting from the motion of the laser beam on the photodetectors. The beam walk introduces an offset into the tracking error signal such that a tracking offset is introduced into the TES (Tracking Error Signal) that for the small lens pupils in small form factor optical devices rapidly becomes large and causes the tracking servo to track off the center of the track. Conventional approaches to solve the beam walk problem include the use of a three beam OPU. However, the use of a three beam OPU increases manufacturing costs and complexity. In addition, optical efficiency is reduced because laser power must be diverted to form the additional beams and additional alignment criteria are involved for the additional spots.

Accordingly, there is a need in the art for improved beam walk compensation approaches.

SUMMARY

In accordance with an aspect of the invention, an optical disk drive, comprising: a movable sled; an optical pick up unit (OPU) connected to the sled, the OPU including a laser configured to transmit a laser beam parallel to an optical disk surface; a means for redirecting the transmitted laser beam normally to the optical disk surface; an objective lens configured to focus the redirected beam onto the optical disk; and an actuator for moving the objective lens to change a position of the focused beam, wherein the laser has a coherence function having maxima spaced apart by intervals, and wherein the disk drive is configured such that a roundtrip optical path length of the laser beam is located in one of the intervals.

In accordance with another aspect of the invention, an optical disk drive frame is provided, comprising: a molded baseplate, the molded baseplate including a metallic spin motor receiving element, the molded baseplate defining a plurality of datums defining a plane for receiving an optical disk cartridge, wherein the metallic spin motor receiving element is positioned in the molded baseplate to achieve a desired tolerance with respect to the defined plane.

In accordance with another aspect of the invention, an optical disk cartridge is provided, comprising: a molded base, the molded base forming a disk-shaped aperture for receiving an optical disk, the molded base forming sidewalls of the optical disk cartridge and having an open top, the molded base including a drive aperture; a shutter attached to the molded base to cover the drive aperture; and a metal plate covering the open top.

In accordance with another aspect of the invention, an optical disk drive having an optical pick-up unit (OPU) that is fixed with respect to a movable objective lens such that movement of the objective lens with respect to the OPU produces an offset in a resulting tracking error signal (TES) is provided, comprising: a processor configured with a tracking servo algorithm to calculate a tracking command responsive to the TES; a digital-to-analog converter configured to convert the tracking command into an analog signal; a tracking actuator driver configured to form a driving command responsive to the analog signal; and a tracking actuator configured to control a position of the lens responsive to the driving command, wherein the processor is further configured to determine, for a given value of the tracking command, an expected value of the analog signal, and in turn, an expected value for the driving command, and in turn, an expected position of the lens, and in turn, an expected offset for the TES signal, the processor being further configured to correct the TES signal according to the expected offset.

In accordance with another aspect of the invention, an optical disk drive is provided, comprising: a disk drive frame; a sled movably disposed on the frame; a carrier frame pivotably attached to the frame, the carrier frame having a closed position in which an optical disk is engaged by the disk drive and an open position in which the carrier frame pivots away from the disk drive to allow the removal of the optical disk, the disk drive having a feature that engages the carrier frame and opposes a bias so as to keep the carrier frame in the closed position; and a mechanical linkage configured to engage the feature in response to movement of the sled so as to release the feature and allow the bias to pivot the carrier frame to the open position.

BRIEF DESCRIPTION OF THE DRAWINGS

The present invention may be better understood, and its numerous objects, features and advantages made apparent to those skilled in the art by referencing the accompanying drawings. The use of the same reference number throughout the figures designates a like or similar element.

FIG. 1b illustrates the optical paths through the OPU of FIG. 1a.

FIG. 2 is a perspective view of an optical disk drive actuator arm containing the OPU of FIG. 1a.

FIG. 5a illustrates a side-elevational of an optical disk drive frame cut-away to show the relationship of a sled, OPU, sled motor, and spin motor in accordance with an embodiment of the invention.

FIG. 5b is a perspective view of the optical disk drive frame of FIG. 5a.

FIG. 7a is a perspective view of the OPU mounted on a flexible circuit board in accordance with an embodiment of the invention.

FIG. 7b is a close-up view of a portion of the flexible circuit board of FIG. 7a.

FIG. 7c is another perspective view of the flexible circuit board of FIG. 7a.

FIG. 9b is an exploded view of the disk cartridge of FIG. 9a.

FIG. 9c is a cross-sectional view of the disk cartridge of FIG. 9a.

FIG. 9d is a close-up view of a portion of FIG. 9c.

FIG. 10b is a side-elevational view of the optical disk drive of FIG. 10a.

FIG. 13a is a cross-sectional view of an optical disk drive having an opened cartridge tray in accordance with an embodiment of the invention.

FIG. 13b is a cross-sectional view of the optical disk drive of FIG. 13a with the cartridge tray in a closed position.

FIG. 14a is a side-elevational view of a flexible circuit board mounted to an optical disk drive sled, wherein the sled is positioned at its innermost travel so as to not engage an interlinking mechanism in accordance with an embodiment of the invention.

FIG. 14b is a side-elevational view of the flexible circuit board and sled of FIG. 14a, wherein the sled is positioned at its outermost travel so at to engage the interlinking mechanism in accordance with an embodiment of the invention.

FIG. 14c is a perspective view of the flexible circuit board and sled of FIG. 14b.

Figure 1A:
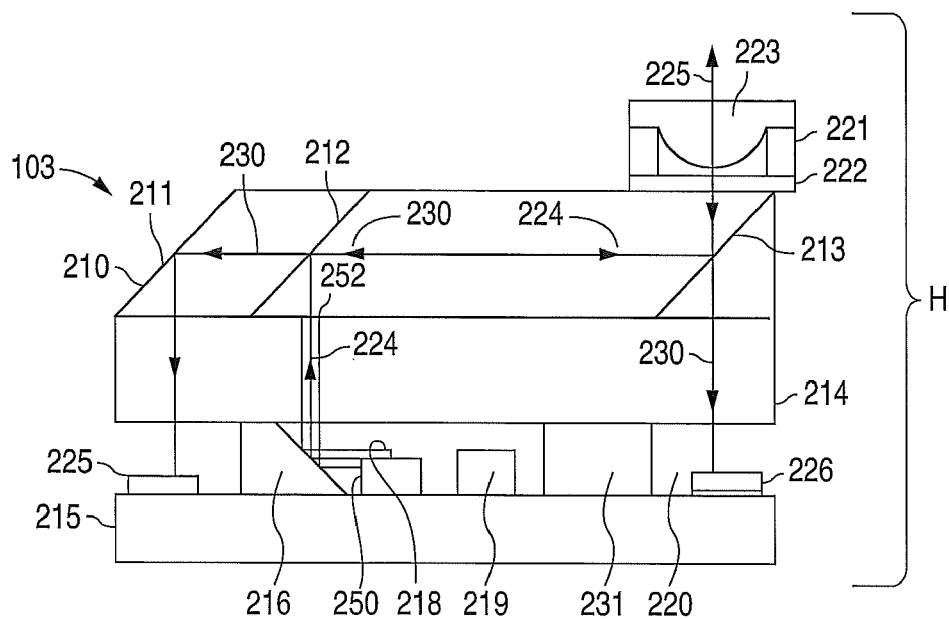
FIG. 1a is a cross-sectional view of an optical pick-up unit (OPU).
Figure 1B:
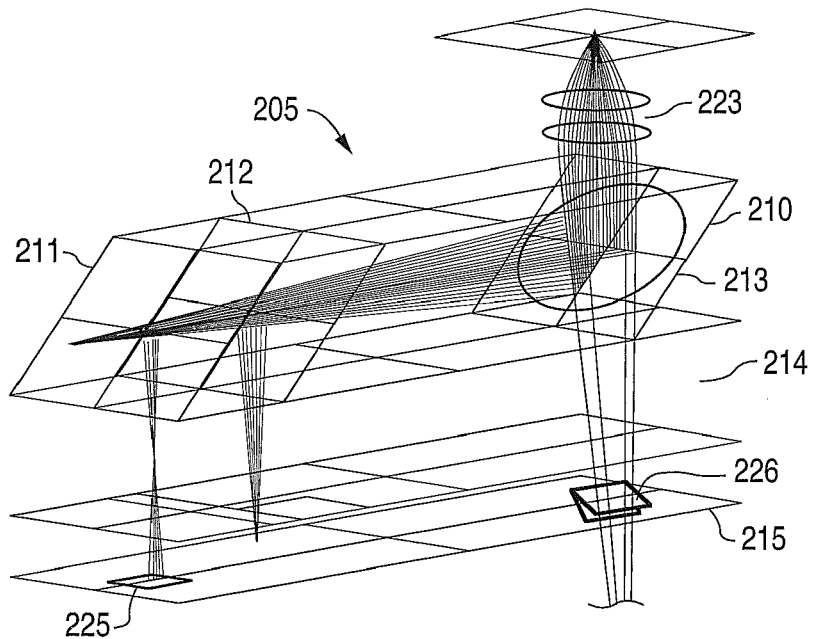
Figure 2:
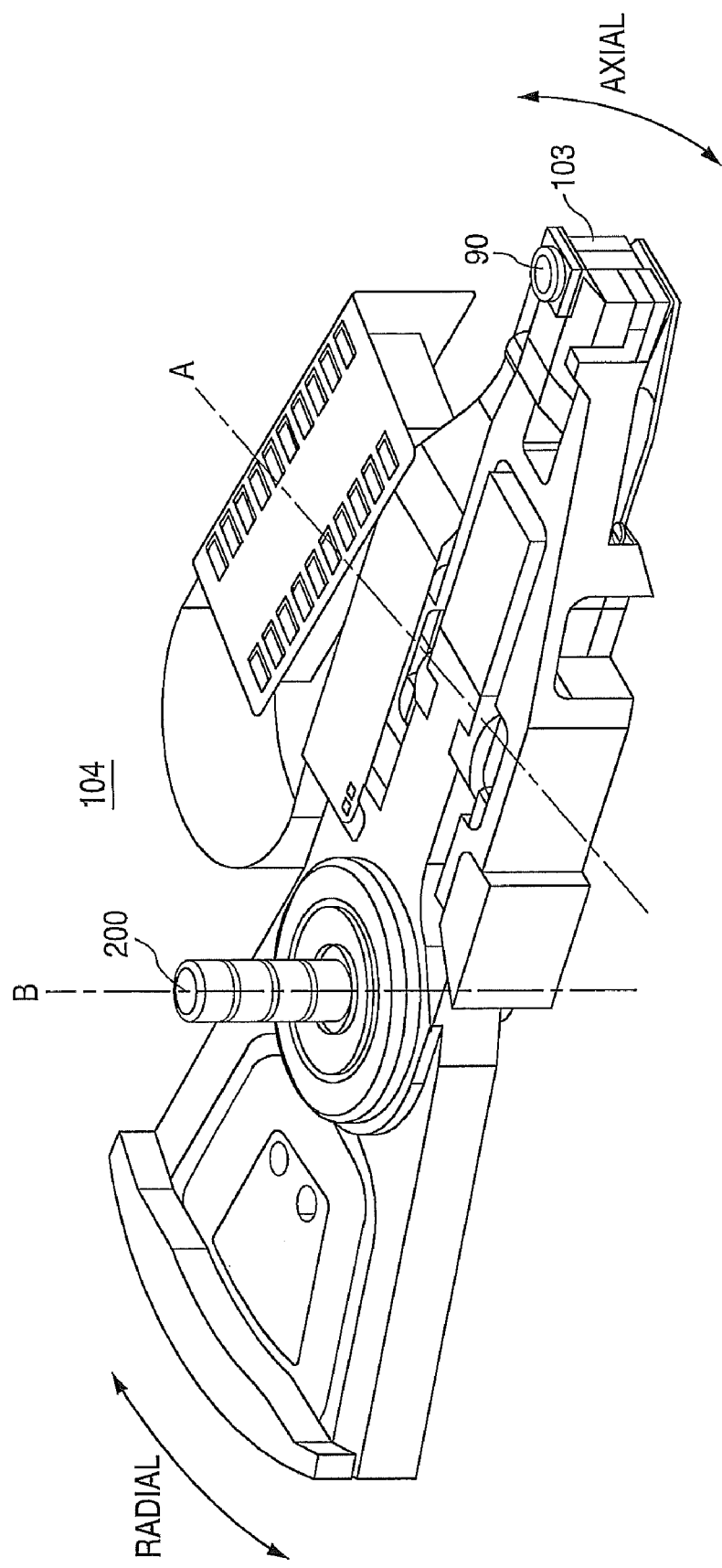

While the invention is susceptible to various modifications and alternative forms, specific embodiments thereof are shown by way of example in the drawings and will herein be described in detail. It should be understood that the drawings and detailed description thereto are not intended to limit the invention to the particular form disclosed; on the contrary, the intention is to cover all modifications, equivalents, and alternatives falling within the spirit and scope of the present invention as defined by the appended claims.

DETAILED DESCRIPTION

Figure 3:
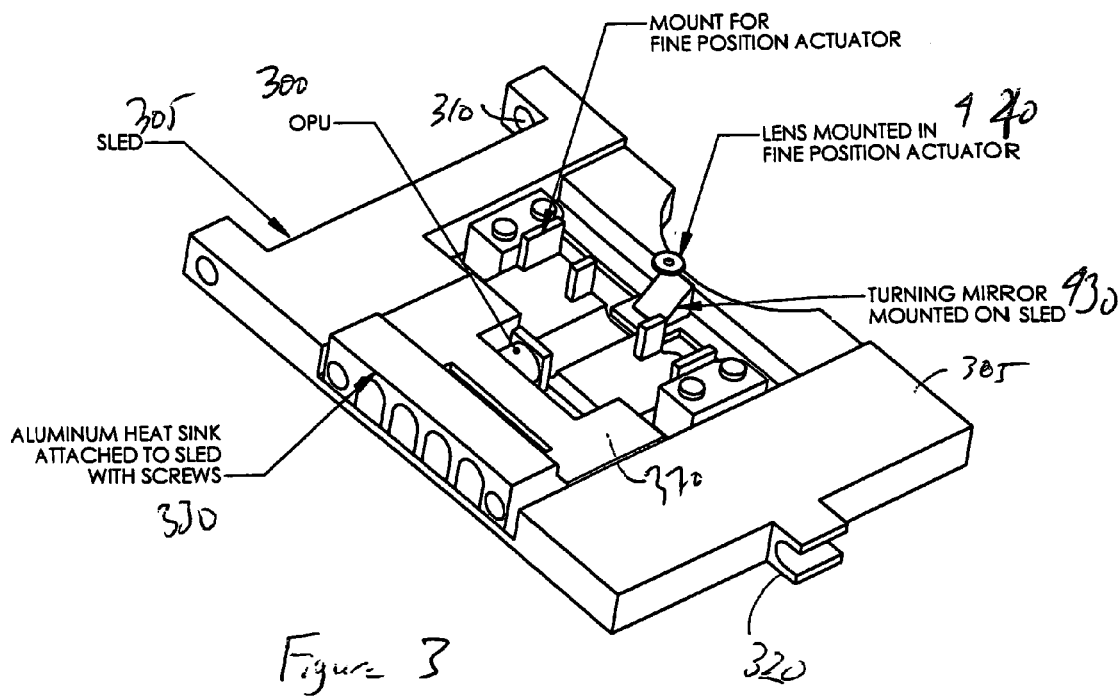
FIG. 3 is a perspective view of a sled-mounted OPU in accordance with an embodiment of the invention.
Figure 4:
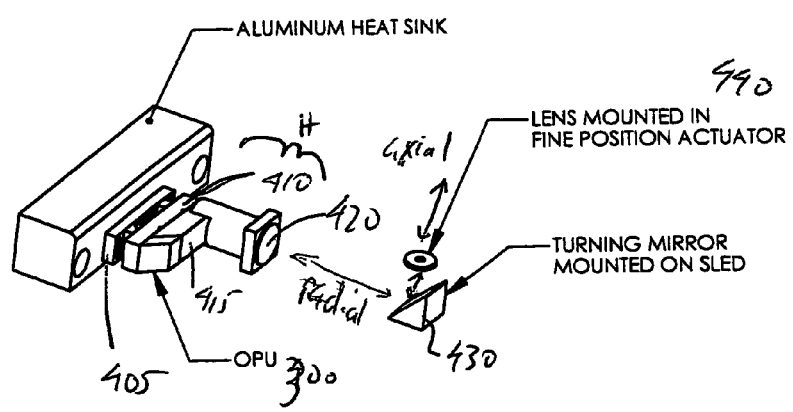
FIG. 4 illustrates the orientation of the OPU, turning mirror, and the lens of FIG. 3.

To advance the state of the art for small form factor optical disk drives, a split-optics-based architecture is provided. As seen in FIG. 3, an optical pick-up unit (OPU) 300 is attached within a sled 305. Any suitable OPU design may be used. For example, an exemplary OPU 300 as illustrated in FIG. 4 includes a silicon submount 405, transparent optical element block 410, and periscope 415 analogous to those described for FIG. 1a. However, an objective lens does not attach to periscope 415. Instead, periscope 415 is configured to transmit into a collimator 420. Collimator 420 collimates the resulting beam from periscope 415 for projection to a turning mirror 430, which reflects the beam into an objective lens 440. Thus, as compared to OPU 103, OPU 300 transmits radially rather than axially with respect to an optical disk (which is not illustrated but would be located above lens 440). In that sense, the height reduction limitation discussed for OPU 103 is removed because a height H of OPU 300 need no longer be additive to the thickness of the optical disk and cartridge.

Figure 5:
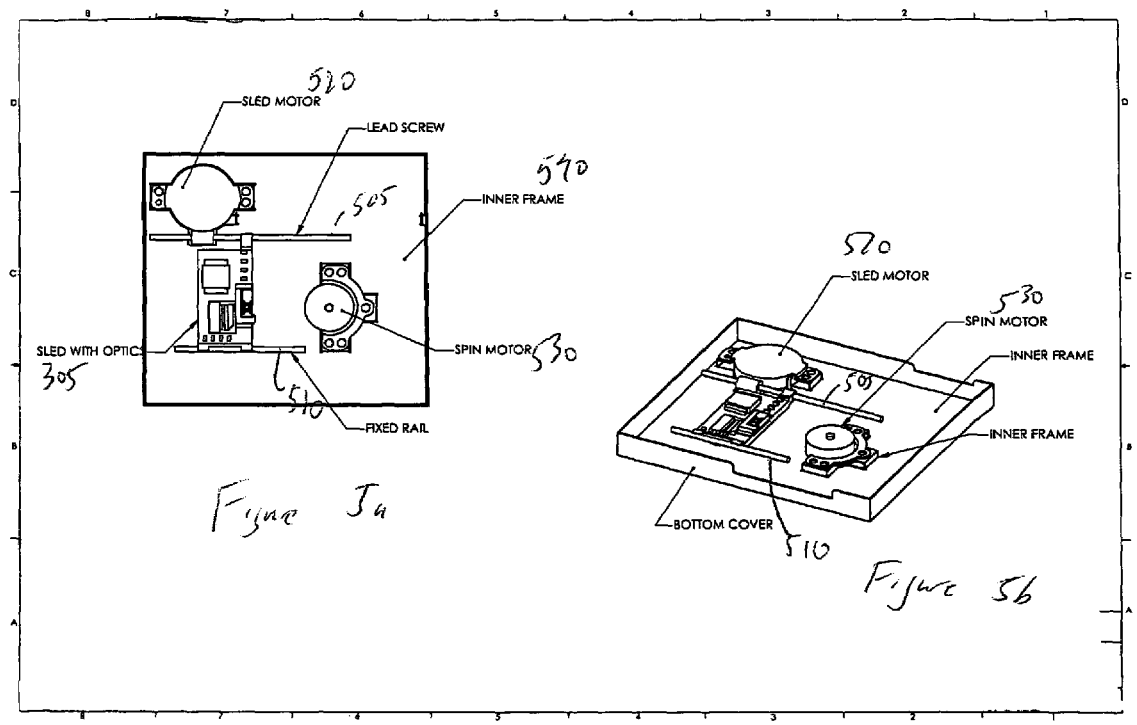

As is conventional in a split-optics-based architecture, coarse tracking is achieved by movement of sled 305 on rails. For example, sled 305 may be mounted on rails 505 and 510 through apertures 310 and bearing 320 as seen in FIG. 5a and FIG. 5b. As sled 304 is displaced on these rails, through for example, actuation by a sled motor 520, a beam projected by lens 440 will move radially across the optical disk, thereby changing track locations. For example, sled motor 520 may function by rotating rail 505, which may be configured as a screw that engages teeth (not illustrated) on sled 305. A spin motor 530 engages the optical disk (not illustrated), which rotates above sled 305. Referring again to FIGS. 3 and 4, lens 440 may be displaced by a two-dimensional actuator (not illustrated) that may either radially or axially displace lens 440 with respect to the optical disk as necessary for fine tracking and focusing purposes. The two-dimensional actuator may be mounted within a mount 330 on sled 305. Rather than use a single two-dimensional actuator, separate fine focusing and tracking actuators may also be used.

It will be appreciated that OPU 300 may be implemented in conjunction with either second surface or first surface optical disks. However, use of first surface optical disks provides a significant advantage for a small form factor design as described previously. Regardless of the disk type being implemented, certain design considerations must be considered as the form factor is reduced. For example, a laser diode (not illustrated) included within OPU 300 on silicon submount 405 will have an output power that consists of a series of lasing modes separated by a characteristic spacing given as:

$$\Delta\lambda = \lambda^2/2nL$$

where $\lambda$ equals the average output wavelength, n is the index of refraction in the laser active region of the laser diode, and L is the length of the laser cavity. This spacing of $\Delta\lambda$ drives a spacing $\Delta L$ of the coherence function for the laser beam from OPU 300, which equals:

$$\Delta L = \lambda^2/\Delta\lambda = 2nL$$

Figure 6:
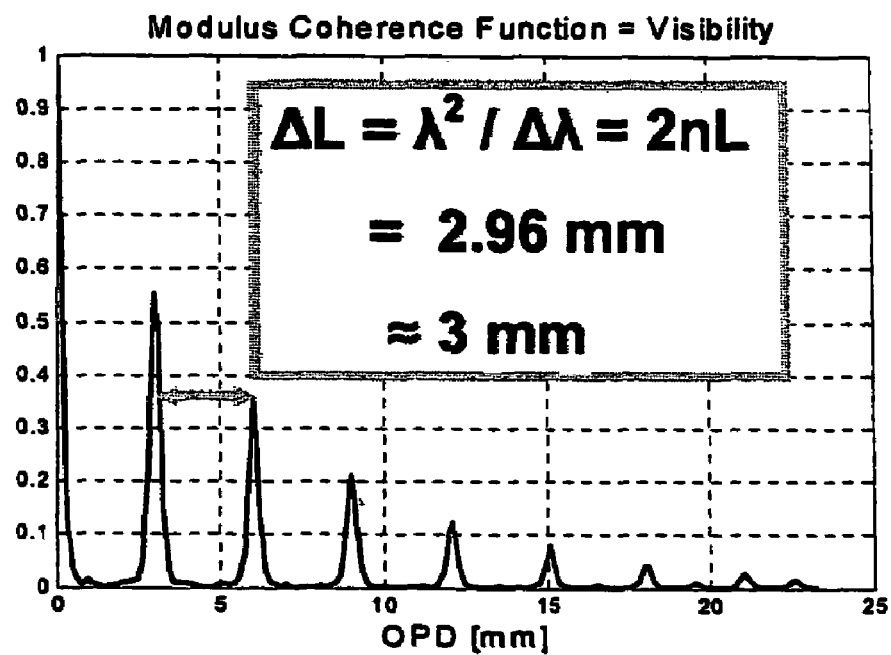
FIG. 6 is a graph of the modulus of the optical coherence function (Visibility Function) for an optical disk drive.

Should $\lambda$ equal 654 nm, the index of refraction n equal 4.23, and L equal 350 nm, $\Delta L$ becomes approximately 3 mm. An exemplary coherence function having such a spacing is illustrated in FIG. 6 as a function of the roundtrip optical path length (OPL) from the laser to the media and back to the laser, which may also be referred to as the optical path difference (OPD) of the light reentering the laser, i.e, feedback light, and the light inside the laser cavity. The roundtrip optical path length is defined by the roundtrip distance the laser beam takes from the laser diode through the OPU and objective lens to the information layer of the optical disk being read or written to. Those of ordinary skill in the art will appreciate that the OPL/OPD does not exactly correspond to the physical distance of such a path but must also account for the relative indices of refraction in the objects along this path. Examination of FIG. 6 indicates that maxima in the coherence function will have negligible effect for path lengths in excess of 25 mm. The strength of the maxima versus the OPL/OPD is a function of the laser linewidth, i.e, the width of a single lasing mode. The broader the linewidth, the more rapidly the maxima diminish versus OPL/OPD. Thus as the form factor of the optical disk drive is decreased, thereby shortening this path below 25 mm for the case illustrated, the maxima in the coherence function become more problematic causing an increase in the laser feedback noise effects and increased interference phenomena from stray light and ghost reflections in the OPU.

In general, a typical laser diode has a cavity length of between approximately 100 and 1000 um. The effective index of refraction for the cavity for wavelengths used in DVD-type devices is typically around 4.23. Thus, the spacing $\Delta L$ for achievable coherence functions will generally range between about 850 um to about 8500 um. Referring back to FIG. 4, movement of sled 305 on its rails for coarse tracking should not affect the optical path length assuming that the optical disk axial runout is within acceptable tolerances. However, actuation of lens 440 for focusing will affect the optical path length. This actuation should not exceed several hundred microns for normal optical disk axial runout tolerances (within a few hundred microns). In turn, OPU 300 is mounted on sled 305 such that the median optical path length lies between coherence function maxima, preferably substantially between adjacent maxima. Thus, given that the maximum optical path length variation will be less than 850 microns, the avoidance of coherence function maxima is assured.

The avoidance of the coherence function maxima is not the only innovation illustrated in FIGS. 3 and 4. For example, the transimpedance amplifiers for the necessary photodetectors as well as the high frequency modulator (HFM) for the laser diode may be integrated onto silicon submount 405. By locating the transimpedance amplifiers adjacent the photodetectors, inductive noise coupling is minimized, thereby allowing higher spin rates of the optical disk and higher data transfer rates. In addition, required board space for separate transimpedance amplifiers and high frequency modulators may be eliminated, further reducing the form factor. To enhance thermal coupling, OPU 300 may be mounted on a separate heat sink 330 made from a thermally conductive material such as aluminum. By making heat sink 330 separate from sled 305, OPU 300 may be mounted onto sink 330, which may then be optically aligned as needed before attaching sink 330 to sled 305.

Electrical components that need to be adjacent to OPU 300 may be located on a flexible circuit board 370 contained within sled 305. The molding of flexible circuit board 370 with respect to OPU 300 may be configured as illustrated in FIG. 7a through FIG. 7c. Flexible circuit board 370 couples to disk drive electronics through an interface 700. To accommodate the movement of sled 305, interface 700 attaches to the remainder of flexible circuit board 370 through U-shaped portion 705. To provide a small form factor, electrical components on board 370 such as a laser driver 710 mount on the surface of board 370 that faces sled 305. In turn, sled 305 may include recesses for these components, further minimizing the form factor. To obviate the need for packaging of OPU 300, flex circuit board 370 includes bond pads 730. Corresponding pads are provided on silicon submount 405 such that OPU 300 may be wire bonded to pads 730. Flexible circuit board 370 may include additional pads 740 for driving the two-dimensional actuator for fine focusing and tracking purposes.

Flexible circuit board 370 mounts onto sled 305 as illustrated in FIGS. 14a and 14b. In this embodiment, sled 305 mounts on passive rails 1400 that have no operative relationship with sled motor 520. Instead, sled motor 520 drives a lead screw 1405 that engages a drive tang 1410 attached to sled 305. As seen in FIG. 14a, lead screw 1405 has been turned such that sled 305 has moved to its innermost position with respect to a optical disk (not illustrated) being driven by spin motor 530. In this position, the innermost tracks on the disk may be accessed. In contrast, FIG. 14b illustrates sled 305 in its outermost position. As seen by comparison of FIGS. 14a and 14b, U-shaped portion 705 accommodates this displacement and allows components on flexible circuit board 370 to be electrically coupled despite this movement. For illustration clarity, the portion of flexible circuit board 370 that overlaps sled 305 has been cross-hatched in FIGS. 14a and 14b.

Figure 8:
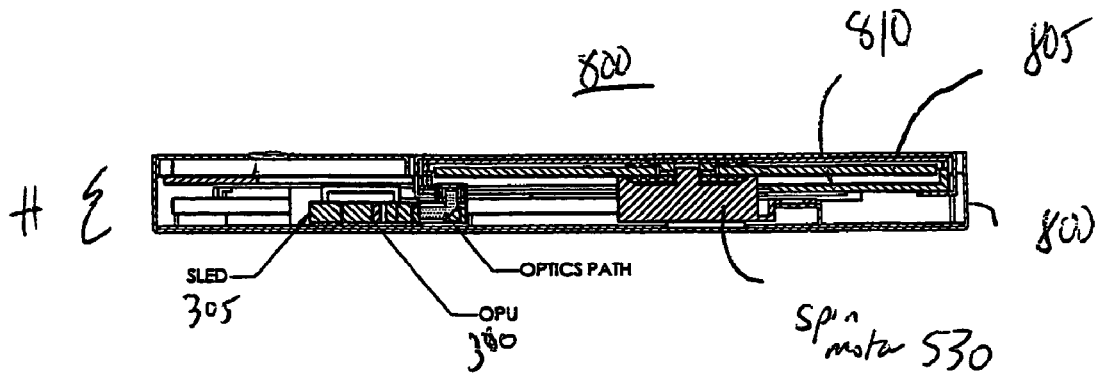
FIG. 8 is a cross-sectional view of a disk drive in accordance with an embodiment of the invention.
Figure 9A:
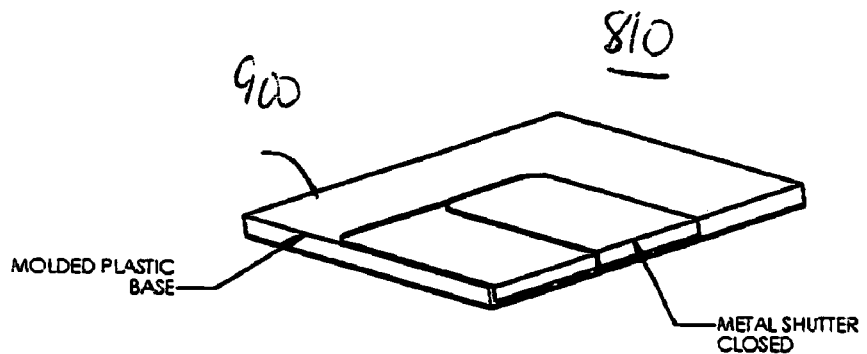
FIG. 9a is a perspective view of a disk cartridge in accordance with an embodiment of the invention.
Figure 9B:
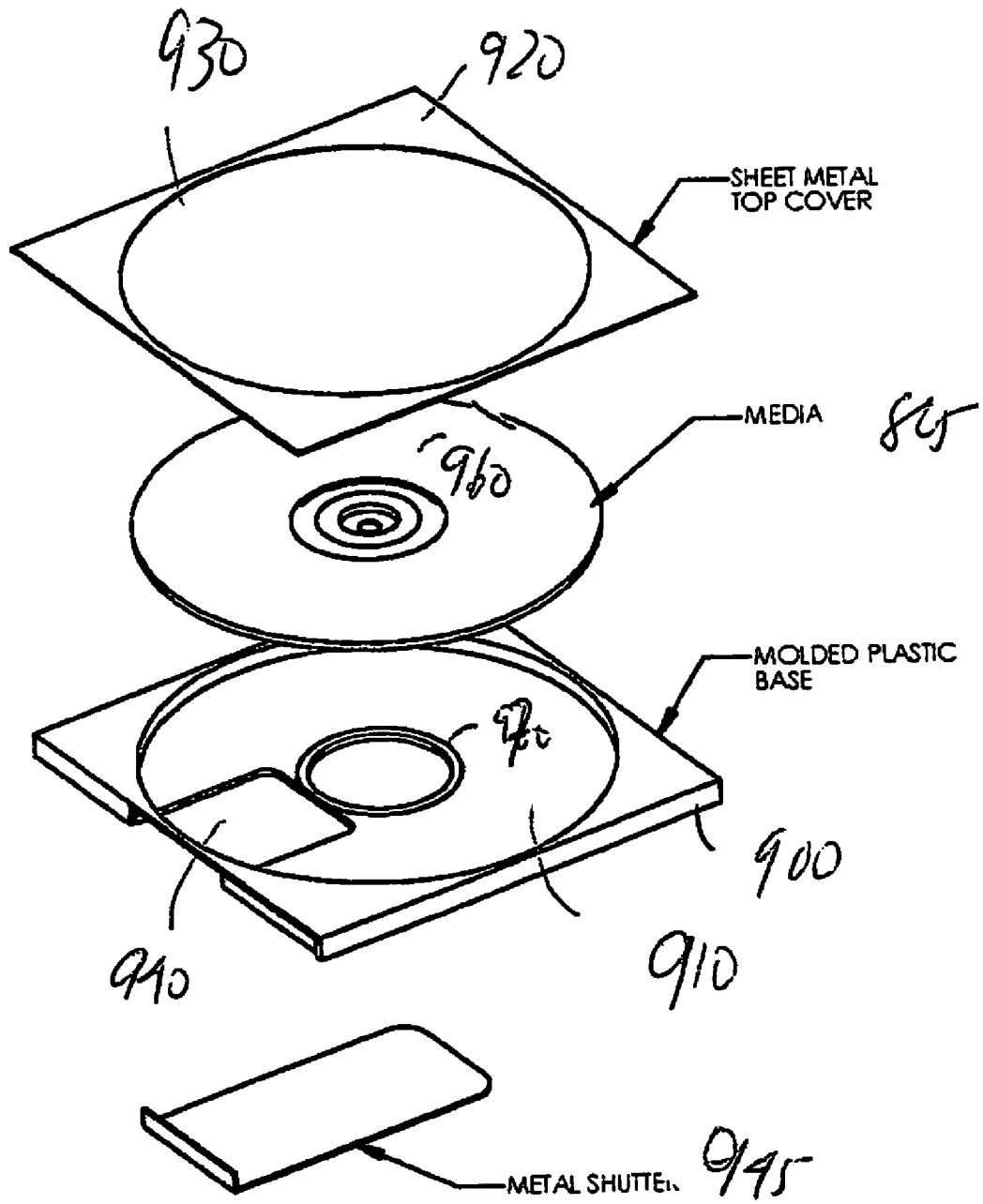

An exemplary disk drive 800 is shown in cross section in FIG. 8. Spin motor 530 mounts within a frame 540 as seen in the cut-away view of FIG. 5. An optical disk 805 spins within a disk cartridge 810. As can be seen from an inspection of FIG. 8, the minimization of the thickness of disk cartridge 810 is an appreciable factor in the overall height H of disk drive 800. To achieve a slim disk cartridge yet provide a suitably stiff design, disk cartridge 810 may be configured as illustrated in FIG. 9a through FIG. 9d. Disk cartridge 810 includes a plastic base 900 defining a recess 910 for receiving optical disk 805, which may be a first surface optical disk. To achieve a slim design, base 900 is covered with a metal top cover 920. For added stiffness, cover 920 may be configured with indentation 930 matching the disk radius. In this fashion, a disk cartridge thickness of just 2 mm may be achieved. An access aperture 940 in base plate 900 is covered by a metal shutter 945 that may be spring-biased. Optical disk 805 may include a magnetic hub 950 that would be driven by a corresponding magnetic hub on spin motor 530. Alternatively, disk 805 may exclude the hub such that spin motor 530 would include a chucking feature that would engage a molded aperture 960. Base plate 900 may include a raised hub 970 for engaging optical disk 805.

The small form-factor optical disk drive and cartridge disclosed herein may be implemented with either a first surface or a second surface optical disk. The optical disk may be entirely read-only, write-once, re-writeable, or a combination of these media types. In one embodiment, the laser wavelength may be 650 nm, the objective lens may have a numerical aperture of 0.86, the optical disk diameter may be 32 mm and have a 0.52 um track pitch and a 300 nm minimum feature size. In such an embodiment, the disk capacity would be 500 MB for a single-sided single information layer disk and 1 GB for a single-sided dual information layera dual layer single sided disk. In another embodiment, the laser wavelength may be 405 nm laser, the objective lens may have a numerical aperture of 0.85, the disk diameter may be 32 mm and have a 0.32 um track pitch and a 160 nm feature size minimum. In such an embodiment, the disk storage capacity would be 1.5 GB for a single-sided single layer disk and 3 GB for a dual layer single-sided disk. However, it will be appreciated that the laser wavelength, numerical aperture, and disk topology may be varied as necessary for a given implementation.

Figure 10A:
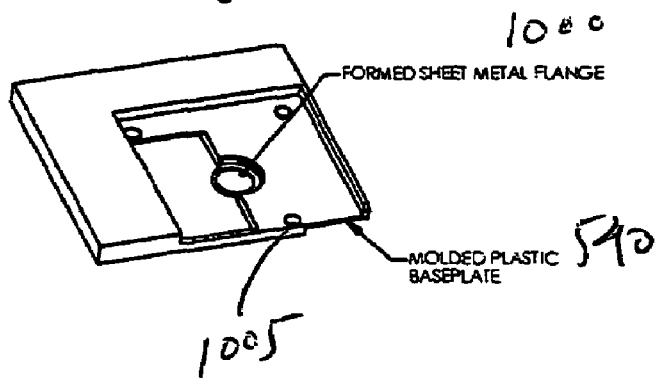
FIG. 10a is a perspective view of an optical disk drive, partially cutaway to show the base plate, in accordance with an embodiment of the invention.
Figure 10B:
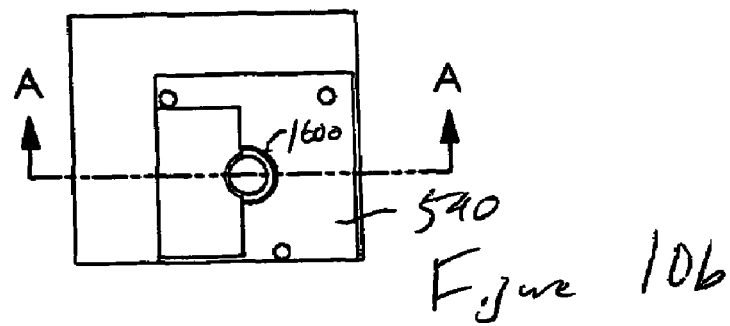
Figure 10C:
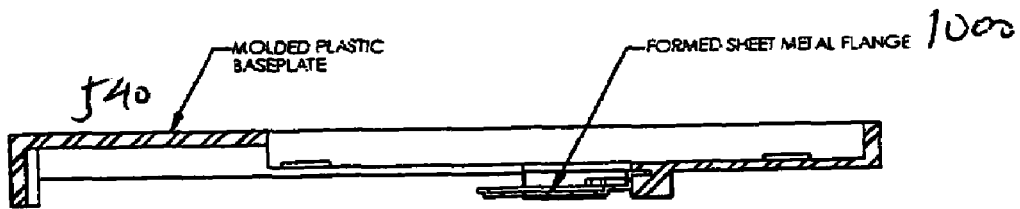
FIG. 10c is a cross-sectional view taken along line A-A in FIG. 10b.

Referring back to FIG. 8, the alignment of spin motor 530 to disk 805 should be precisely controlled to achieve acceptable axial disk runout and other tolerances. To achieve this precision economically, a base plate 540 (FIGS. 5a and 5b) of the optical disk drive frame may be formed from injected molded plastic. The molding of base plate or bottom cover 540 may incorporate a metallic mounting feature such as flange 1000 shown in FIG. 10a through FIG. 10c. Because flange 1000 may be precisely aligned to bottom cover 540 during the molding process, when spin motor 530 is affixed to flange 1000 through, for example, a press fit, spin motor 530 is also precisely aligned with molded datums 1005 formed on base plate 540. Datums 1005 receive the disk cartridge and thereby align the disk cartridge precisely, to spin motor 530.

Figure 11:
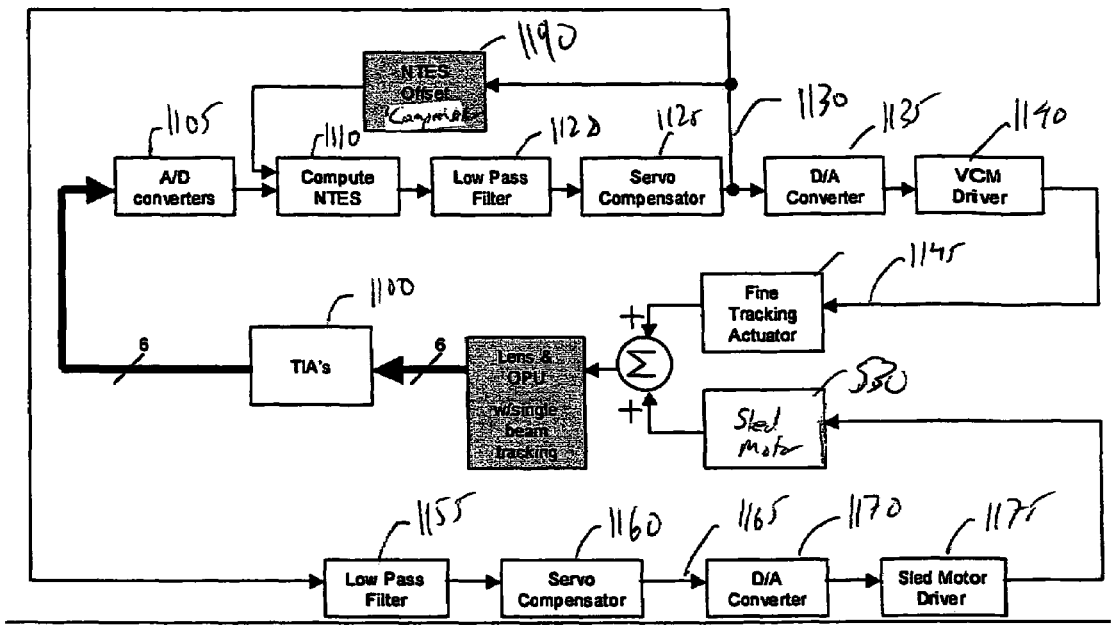
FIG. 11 is a block diagram of a tracking servo system configured to eliminate beam walk in accordance with an embodiment of the invention.

The optical disk drives described herein may be configured to use an all-digital servo architecture as described in U.S. Ser. No. 09/950,378. In this architecture, analog circuitry is not used to form the tracking error signal (TES) and the focus error signal (FES). Instead, the photodetector signals from OPU 300 are digitized and received by a processor such as a digital signal processor (DSP). The DSP itself forms the TES and FES signals. In this fashion, the DSP has the power to decide which servo (focus or tracking) that should be serviced and then generate the required error signals. However, a problem encountered by a split-optics-based optical disk drive architecture such as that described with respect to FIG. 3 is the need for beam walk compensation. As objective lens 440 is moved with respect to OPU 300, the received light position on the photodetector(s) within OPU 300 will change, thereby causing an undesired offset in a resulting tracking error signal (TES). A tracking servo architecture that eliminates the beam walk offset is illustrated in FIG. 11. This tracking architecture may be implemented in a DSP or in dedicated hardware. Transimpedance amplifiers 1100 convert photocurrents from photodetectors in OPU 300 into voltages that are digitized in A/D converters 1105. A normalized TES (NTES) is then calculated from the digitized sensor signals in block 1110. NTES then passes through a low pass filter 1120 and servo compensator 1125 to form a tracking command 130. Command 1130 is then converted into analog form in D/A converter 1135 to be received by driver 1140 so as to form a fine tracking command 1145. Fine tracking command 1145 is received by a fine tracking actuator 1150, which may be a two-dimensional actuator as described previously to also accommodate fine focus actuation.

Tracking command 1130 is also processed by a low pass filter 1155 and a servo compensator 1160 to form a coarse tracking command 1165. A D/A converter 1170 converts command 1165 into analog form for processing by a sled motor driver 1175, which commands sled motor 530 accordingly. To prevent beam walk, an NTES offset compensator 1190 computes the position where lens 440 will be in response to the current command 1130. Based upon this calculated position, compensator 1190 determines the amount of TES offset this lens position will introduce. NTES is then offset by the appropriate polarity and amplitude to eliminate the beam-walk-induced TES offset. Compensator 1190 may be implemented in either hardware of firmware.

Figure 12:
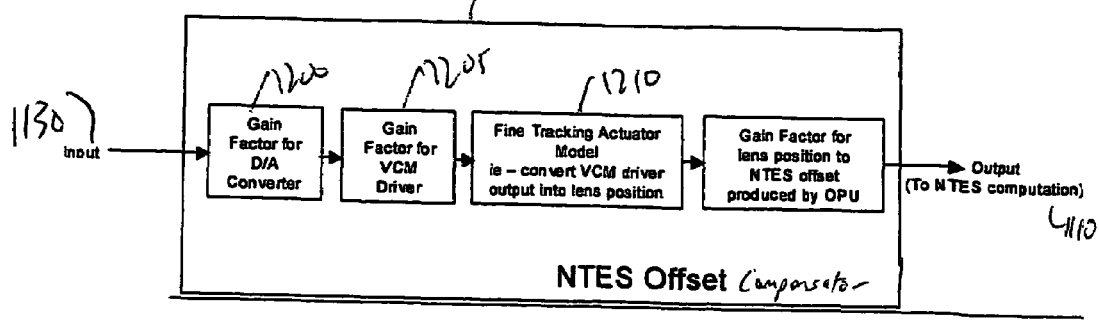
FIG. 12 is a block diagram for the NTES offset compensator of FIG. 11.

A block diagram implementation of compensator 1190 is illustrated in FIG. 12. A gain factor correction 1200 computes what voltage would be produced by D/A converter 1135 for the current tracking command 1130. Similarly, a driver gain correction 1205 computes the driver output from driver 1140 in response to the determined voltage. A fine tracking model 1210 then determines the position of the fine tracking actuator in response to the computed driver output. For example, should the actuator function as a second order system and driver 1140 function as a transconductance amplifier, a Laplace domain representation of the actuator position may be as follows:

$$\text{Output}(s) = \text{Input}(s) \times \frac{K_f}{m \times s^2 + K_d \times s + K_s}$$

where $K_f$ is the force constant of the actuator, m is the moving mass of the actuator, $K_d$ is the damping factor for the actuator, and $K_s$, is the spring constant for the actuator. Having thus determined the position of the lens, a gain factor may be applied in step 1220 to determine how much NTES offset would result. Given this NTES offset, the computation of NTES may be adjusted accordingly to provide beam walk compensation. Although the beam walk compensation has been described with reference to a single beam optical disk drive, it may also be applied to three beam optical disk drives.

Referring now to FIG. 13a and FIG. 13b, an optical disk drive configured to receive optical disk cartridge 810 may use a carrier frame 1300. Carrier frame 1300 is coupled to the disk drive such that it may be manually moved into an open position as seen in FIG. 13a. Carrier frame 1300 includes a feature that opens shutter 945 as cartridge 810 is inserted into carrier frame 1300. By closing carrier frame 1300 as seen in FIG. 13b, spin motor 530 may engage disk 805. A feature is provided to engage carrier frame 1300 and hold it in the closed position. To eject the cartridge, sled 300 may be driven into a parked position, whereupon the feature holding carrier frame 1300 is released. A spring bias may be maintained on carrier frame so that it swings open during the ejection of the cartridge.

A mechanical linkage 1420 for releasing the feature holding carrier frame 1300 in the closed position is illustrated in FIGS. 14a through 14c. Mechanical linkage 1420 may include a first linkage 1430 that is engaged by sled 305 when sled is driven into the outermost, parked position as seen in FIGS. 14b and 14c. It will be appreciated that a small form factor design is enhanced by limiting the amount of travel necessary for sled 305 to activate mechanical linkage 1420 to release the feature holding carrier frame 1300 in the closed position. Thus, first linkage 1420 may be coupled to a second linkage 1430 that pivots on a pivot 1435. By locating pivot 1435 at the appropriate location with respect to the end of first linkage 1420, a desired degree of leverage is introduced to multiply the travel of sled 305 with respect to an opposing end of second linkage 1430. For example, a travel of 0.25 mm by sled 305 may result in a displacement of the opposing end of second linkage 1430 by over 1 mm. Depending upon the location of the feature that will be engaged to release carrier frame 1300, a third linkage 1440 may be connected to the opposing end of second linkage 1430 such that it is third linkage 1440 that engages the feature. Alternatively, the opposing end of second linkage 1430 may also be used for this engagement. To prevent accidental release of the feature, linkage 1430 may be lightly biased to oppose the displacement by sled 305.

Although the invention has been described with respect to particular embodiments, this description is only an example of the invention's application and should not be taken as a limitation. For example, the wavelengths, numerical apertures, disk capacity and topology, and other factors specifically described herein are merely exemplary. Consequently, the scope of the invention is set forth in the following claims.

We claim:

1. An optical disk drive, comprising:
    a movable sled operable to translate in a parallel direction with respect to an optical disk surface;
    an optical pick up unit (OPU) connected to the sled, the OPU configured to transmit a laser beam parallel to an optical disk surface;
    a means for redirecting the transmitted laser beam normally to the optical disk surface and for redirecting a resulting reflected laser beam from the optical disk into the parallel direction towards the OPU, the means being separate from the OPU;

an objective lens configured to focus the redirected beam onto the optical disk; and an actuator for moving the objective lens to change a position of the focused beam, wherein a laser in the OPU has a coherence function having maxima spaced apart by intervals, and wherein the disk drive is configured such that a roundtrip optical path length of the laser beam is located in one of the intervals, and wherein the roundtrip optical path is less than 25 millimeters.

2. The optical disk drive of claim 1, wherein the disk drive is configured such that the optical path length is located substantially in the middle of the one interval, and wherein the means comprises a turning mirror.

3. The optical disk drive of claim 1, wherein the OPU includes a silicon submount having photodetectors, the silicon submount having transimpedance amplifiers integrated thereon converting photocurrents from the photodetectors into voltage signals.

4. The optical disk drive of claim 3, wherein the silicon submount further includes a high frequency modulator integrated thereon to modulate the laser within the OPU.

5. The optical disk drive of claim 1, wherein the OPU connects to the sled through a heat sink.

6. The optical disk drive of claim 1, further comprising:
a flexible circuit board attached to the sled; wherein the OPU is wire bonded to the flexible circuit board.

7. The optical disk drive of claim 6, wherein the flexible circuit board includes a laser driver for driving the laser in the OPU.

8. The optical disk drive of claim 7, wherein the laser driver mounts to a surface of the flexible circuit board facing the sled.

9. The optical disk drive of claim 1, wherein a form factor for the optical disk drive is no greater than 60×46×6 mm.

10. An optical disk drive, comprising:

a movable sled operable to translate in a parallel direction with respect to an optical disk surface;

an optical pick up unit (OPU) connected to the sled, the OPU configured to transmit a laser beam parallel to an optical disk surface;

a means for redirecting the transmitted laser beam normally to the optical disk surface and for redirecting a resulting reflected laser beam in the parallel direction towards the OPU, the means being separate from the OPU; and an objective lens configured to focus the redirected beam onto the optical disk, wherein a laser in the OPU has a coherence function having maxima spaced apart by intervals, and wherein the disk drive is configured such that a roundtrip optical path length of the laser beam is located in one of the intervals, and wherein the roundtrip optical path is less than 25 millimeters.

* * * * *